United States Patent

Horii et al.

[11] Patent Number: 5,870,099
[45] Date of Patent: Feb. 9, 1999

[54] METHOD OF SUPPORTING PERSPECTIVE PROJECTION

[75] Inventors: Yoichi Horii; Kiyoshi Arai, both of Kokubunji, Japan

[73] Assignee: Hitachi, Ltd., Tokyo, Japan

[21] Appl. No.: 753,600

[22] Filed: Nov. 27, 1996

[30] Foreign Application Priority Data

Nov. 29, 1995 [JP] Japan .................................. 7-310319

[51] Int. Cl.⁶ .................................................. G06F 15/00
[52] U.S. Cl. ............................................................ 345/427
[58] Field of Search ................................. 345/427, 425, 345/422, 419, 420

[56] References Cited

U.S. PATENT DOCUMENTS 5,058,042 10/1991 Hanna et al. ............................ 636/522
5,590,250 12/1996 Lamping et al. ........................ 345/427
5,742,295 4/1998 Lindholm ................................ 395/427

*Primary Examiner*—Phu K. Nguyen
*Attorney, Agent, or Firm*—Antonelli, Terry, Stout & Kraus, LLP

[57] ABSTRACT

A method, apparatus and computer program for generating a perspective projection of a three-dimensional object compatible with a two-dimensional perspective background image. In the invention rectangular parallelepiped guide figure is displayed on a two-dimensional background image. According to inputs from a user, a rectangular parallelepiped guide figure manipulation routine deforms and moves the rectangular parallelepiped guide figure. Once the rectangular parallelepiped has been manipulated to correspond to key features of the background image, a camera angle calculation routine calculates the camera angle, such as the eye position, the viewing direction and the field of view angle for the rectangular parallelepiped guide figure. Using the calculated camera angle, a perspective drawing of a three-dimensional object compatible with the two-dimensional perspective background image is generated.

70 Claims, 10 Drawing Sheets

| | | |
|---|---|---|
| 402 | TWO-DIMENSIONAL VERTEX COORDINATES (8 POINTS) | k[i].h, k[i].v |
| 404 | THREE-DIMENSIONAL VERTEX COORDINATES (8 POINTS) | p[i].x, p[i].y, p[i].z |
| 406 | VANISHING POINTS (3 POINTS) | v[i].h, v[i].v |
| 408 | ROTATION ANGLE | $\alpha, \beta$ |
| 410 | HEIGHT | h |

METHOD OF SUPPORTING PERSPECTIVE PROJECTION

BACKGROUND OF THE INVENTION

The present invention relates to a method, apparatus and computer program for aiding in making and editing drawings by using a computer. More particularly the present invention relates to a method, apparatus and computer program for aiding in the proper projection of a three-dimensional perspective view of an object conforming onto a two-dimensional perspective view of a background.

A perspective projection is a method of drawing which involves setting a vanishing point and drawing a three-dimensional figure of an object on a two-dimensional plane according to the vanishing point while giving the drawing some reality in terms of distance. In the field of computer graphics, drawing an object on a two-dimensional plane employs the above-described perspective projection so as to emphasize the reality of distances in a drawing.

As a way to support the generation of a perspective projection, a first conventional method is available which uses a computer and involves steps of automating or standardizing the technique used in the drawing and making of corrections on two-dimensional inputs from a user. To explain in more detail, this first conventional method, as shown in FIG. 11A, calculates, by computer, vanishing points 917, 918 from four guide lines 915 set by the user on a picture 910 of a background and, based on the vanishing points, aids in drawing a figure that conforms with a perspective projection of the background image. This method has been realized by some computer graphics software and is discussed in pages 22–31 of the Collection of Papers for 7th Nikograph Paper Contest.

A second conventional method of generating a perspective projection involves the user entering three-dimensional coordinates of an object and a camera angle. The camera angle includes parameters such as three-dimensional coordinates of an eye position, a three-dimensional vector representing a viewing direction, and a field of view angle. With the three-dimensional coordinates of an object and the camera angle determined, it is now possible to calculate how the object can be represented on the two-dimensional plane. This method has been realized in many three-dimensional Computer Aided Design (CAD) systems.

In the above-described first conventional method that standardizes the technique of drawing in a computer, the essential process is to calculate the vanishing points from arbitrary four guide lines. The positions of the vanishing points are calculated by determining the intersecting points between extensions of two facing guide lines. From the positions of the two vanishing points thus determined, the camera angle is calculated.

With the first conventional method, however, a perspective projection having three vanishing points cannot be handled. Further, as shown in FIG. 11B, very slight manipulation of one guide line 920 and 930 results in the vanishing point moving a great distance 921-1, 931-1, making the drawing process unstable. For images such as shown in the picture 910 of FIG. 11A, in particular, although the lines corresponding to 923 and 924 can be found, there is no clue related to 922 and 920 making the determination of vanishing points by this method difficult. When guide lines are set along the crest lines of an object or building as an aid for drawing, as shown in FIG. 11C, although the vanishing point 950 can be determined at all times, the vanishing point 944 which is obtained from 941 and 943 and the vanishing point 952 on the opposite side of the vanishing point 950 cannot be determined reliably. As a result, a perspective view as desired by the user cannot be drawn.

In the above-described second conventional method realized in three-dimensional CAD systems, the result of a perspective projection is determined by the three-dimensional coordinates of an object and the camera angle. It is, however, difficult for a user to figure out what the drawing he or she made will look like from this relationship, and many trials and errors must be performed before one can produce a desired perspective projection. While it is possible to make adjustments on three-dimensional coordinates, it is difficult to adjust the three-dimensional coordinates to produce the effect of appearing near or far.

SUMMARY OF THE INVENTION

An object of the present invention is to provide a method, apparatus and computer program for supporting perspective projection of an object on a display of a computer.

Another object of the present invention is to provide a method, apparatus and computer program for supporting perspective projection of a three-dimensional shape onto a two-dimensional background image displayed on a display of a computer.

Yet another object of the present invention is to provide a three-dimensional CAD computer program including a perspective projection function for supporting perspective projection of a three-dimensional shape onto a two-dimensional background image displayed on a display of a computer.

To achieve the above-described objects, the present invention automates or standardizes the technique of drawing in a computer. Instead of using the above-described conventional methods, the present invention makes use of a three-dimensional guide figure such as a rectangular parallelepiped as an aid in performing the perspective projection.

In the present invention the three-dimensional coordinates of the vertices of the three-dimensional guide figure are controlled by matching them with the two-dimensional coordinates obtained when it is projected onto a two-dimensional plane. The user manipulates vertices, sides and planes of the guide figure using a pointing device such as mouse in conformity with the key features of the perspective projection of a background image. The key features of the perspective projection includes parts of the background image representing depths, such as crest lines of a building and roads. The two-dimensional coordinates of the vertices of the guide figure thus obtained are used to calculate the camera parameters including camera angle. Based on the camera angle, a perspective view is made of a three-dimensional figure as it is projected to the two-dimensional plane placed in front of the background image and then the two-dimensional perspective image of the object is combined with the perspective background image before being output.

The data of the perspective view projected onto the two-dimensional space may be converted into other type of data, such as postscript, so that they can be taken into data of an arbitrary two-dimensional figure editing software and text editing software. It is also possible to insert the three-dimensional figure data and the camera angle into data of desired three-dimensional CAD data.

By matching the sides of the guide figure to key features of the perspective background image and calculating the camera angle for the guide figure, it is possible to output a synthesized view compatible with the perspective background image.

The present invention, as described above, particularly provides that a three-dimensional guide figure is displayed on a display screen of a computer wherein the three-dimensional guide figure includes a plurality of vertices which are positioned over a two-dimensional perspective background image. A user is permitted to manipulate the sides and vertices of the three-dimensional guide figure so as to cause the sides and vertices to match key features of the two-dimensional perspective background image. Thereafter the present invention calculates a camera angle of the background image based upon a camera angle of the three-dimensional guide figure.

The present invention as described above may be provided by a system which executes a computer program retrieved from a storage medium such as a floppy disk, CD or memory. The computer program may also be retrieved from a storage medium provided by a server via a network such as the InterNet. The computer program may be provided alone or as part of a three-dimensional CAD computer program.

BRIEF DESCRIPTION OF THE DRAWINGS

The present invention will be more apparent from the following detailed description, when taken in conjunction with the accompanying drawings, in which.

DETAILED EMBODIMENTS OF THE INVENTION

The present invention will be described by referring to the accompanying drawings.

1. System Configuration

Figure 1:
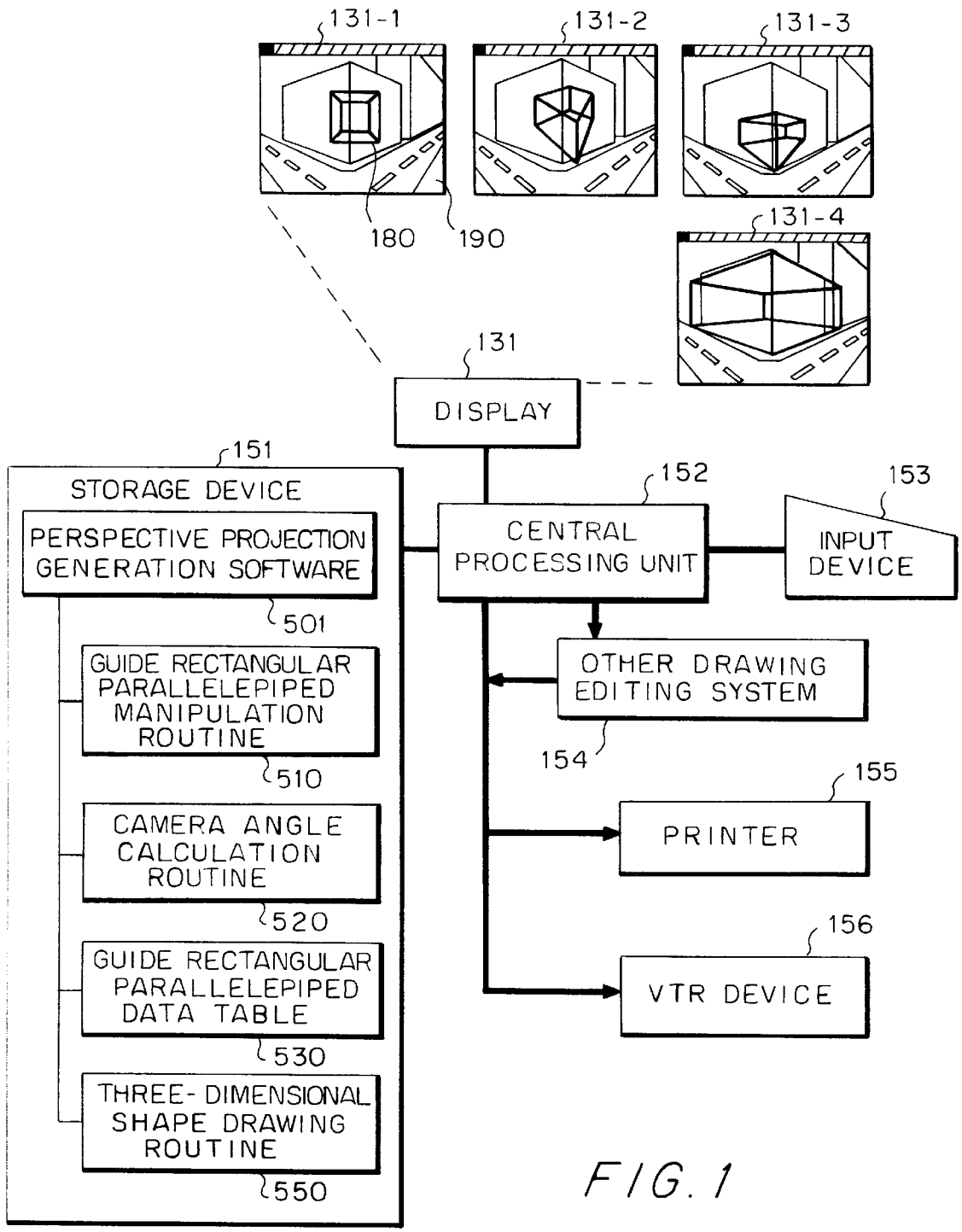
FIG. 1 is a schematic diagram illustrating a perspective view generation support system of the present invention, a background image and a guide rectangular parallelepiped both shown on the display, and manipulations performed on the guide rectangular parallelepiped.

FIG. 1 illustrates a perspective drawing generation support system of the present invention.

A display screen 131 displays a perspective view projected on a display of the system. Software 501 for perspective projection according to this invention is stored in a storage device 151 connected to a central processing unit 152. The software 501 may be provided as part of a three-dimensional CAD computer program (now shown). The software 501 starts a guide figure manipulation routine 510. The guide figure may be a rectangular parallelepiped or any other figure having sides and vertices. In order to aid in understanding the present invention henceforth a rectangular parallelepiped will be used as the guide figure. The software 501 starts the guide figure manipulation routine 510 to move and deform the rectangular parallelepiped guide figure according to the key features of the perspective background image 131-1, 131-2, 131-3, 131-4, and also starts a camera angle calculation routine 520 to calculate the camera angle. In a three-dimensional shape drawing routine 550, the software 501 for perspective projection overwrites a three-dimensional shape perspective drawing on the background image by using the calculated camera angle.

The data of the generated perspective projection is sent as two- or three-dimensional figure data, as required, to a figure editing system 154, after which the data is either entered to a printer 155 for printout on paper or to a VTR device 156 to make video software. This figure editing system 154 is a system that uses, for example, two-dimensional editing software, text editing software and three-dimensional CAD software.

2. Processing Flow

Figure 2:
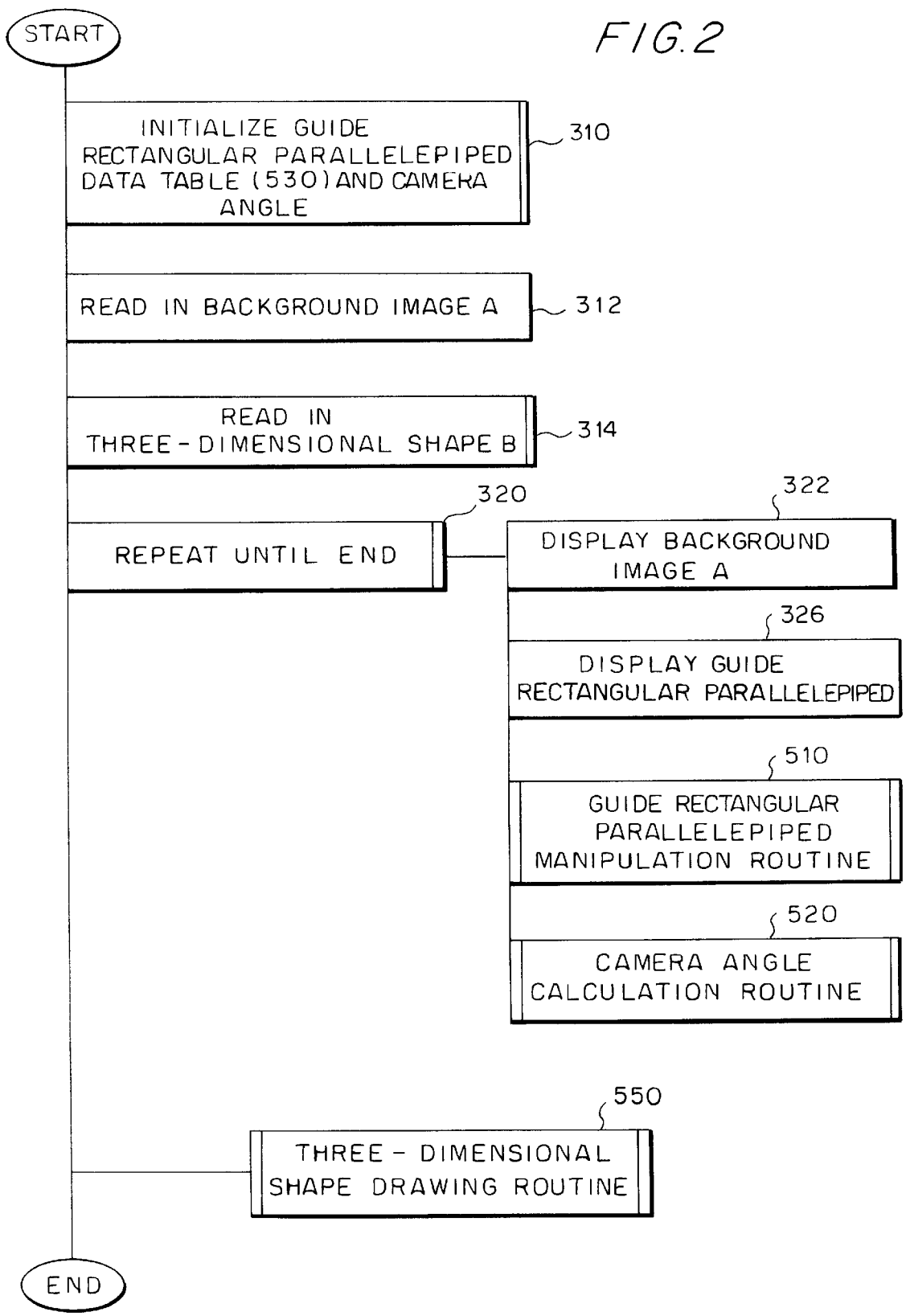
FIG. 2 is a flowchart of the processing performed by the perspective view generation support system of the present invention.

By referring to FIGS. 1 and 2, the flowchart 300 of the processing to be performed to generate a perspective projection by the system when the software (computer program) is executed. The computer program which is executed by the system of the present invention may be retrieved from a storage medium such as a floppy disk, CD, memory or the like. The computer program also may be retrieved from a storage medium provided by a server via a network such as the InterNet.

The software 501 for perspective projection in the storage device 151 is started. At step 310, the rectangular parallelepiped guide figure data table 530 and the camera angle C are initialized. The camera angle here signifies the three-dimensional coordinates of an eye position, the three-dimensional vector representing the viewing direction, and the field of view angle. The rectangular parallelepiped guide figure data table 530 is described in detail below. At step 312, a two-dimensional image A is read in. Step 314 reads in three-dimensional shape data B to be drawn in front of the background image. In step 320, subroutines 322 to 550 are repeated.

At step 322 the two-dimensional background image A is displayed on the screen 131-1 as background 190. At step 326 the rectangular parallelepiped guide FIG. 180 is overwritten on the screen 131-1. At step 510, the user manipulates the rectangular parallelepiped guide figure in compliance with the key features of the perspective background image by using a mouse or other input device as illustrated in screens 131-2 through 131-4. Based on the user manipulation the computer updates the rectangular parallelepiped guide figure data table 530. Step 520 calculates the camera angle C from the updated rectangular parallelepiped guide figure data table 530. Step 550 overwrites the three-dimensional shape data B in front of the background 190. These steps 320–550 are repeated until a stop command is entered, thus generating a synthesized drawing which is compatible with the perspective background image.

3. Rectangular Parallelepiped Guide figure Data Table

Figures 3A, 3B:
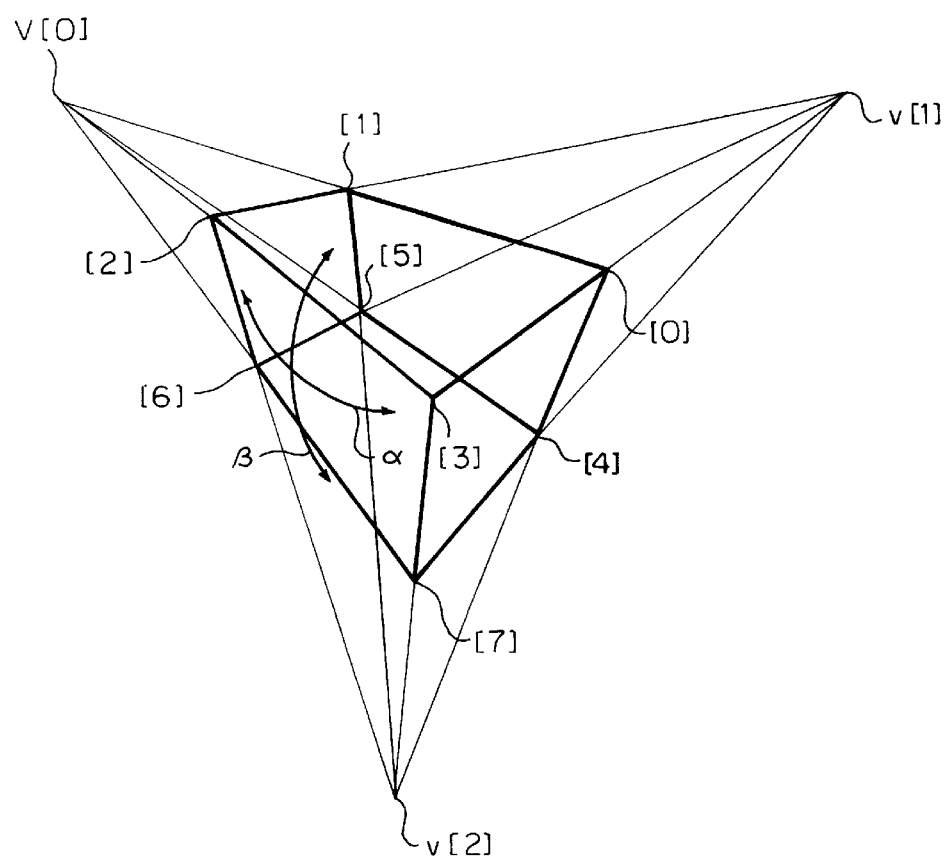
FIGS. 3A and 3B are diagrams illustrating a rectangular parallelepiped guide figure data table and a rectangular parallelepiped guide figure.

FIGS. 3A and 3B are referenced in explaining the rectangular parallelepiped guide figure data table 530. The rectangular parallelepiped guide figure data table is initialized when the software 501 is started. This data table is updated by the rectangular parallelepiped guide figure manipulation routine 510 and used to calculate the camera angle C 520. In FIG. 3A, reference number 402 represents horizontal and vertical coordinates $k_i(h)$ and $k_i(v)$ where i is an integer from 0 to 7 and corresponds to each vertex shown in FIG. 3B. Reference number 404 represents three-dimensional coordinates (p[i].x, p[i].y, p[i].z) $P_i(x)$, $P_i(y)$ and $P_i(z)$ of each vertex of the rectangular parallelepiped guide figure. Reference number 406 represents two-dimensional coordinates of three vanishing points that can be calculated from 404. α and β of reference number 408 represent rotation angles of the guide rectangular parallelepiped about the horizontal axis and about the vertical axis, respectively. Reference number 410 is a height of the guide rectangular parallelepiped. From these is calculated a ratio of magnification that is used when projecting the three-dimensional shape.

4. Rectangular Parallelepiped Guide Figure Manipulation Routine

Figure 4:
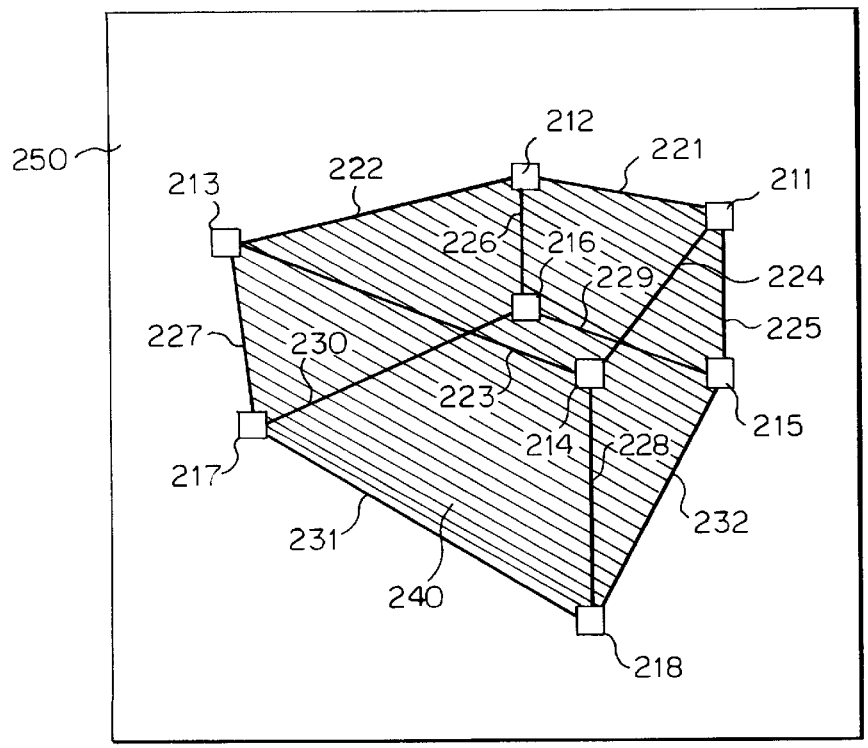
FIG. 4 is a diagram illustrating a rectangular parallelepiped guide figure.
Figure 5:
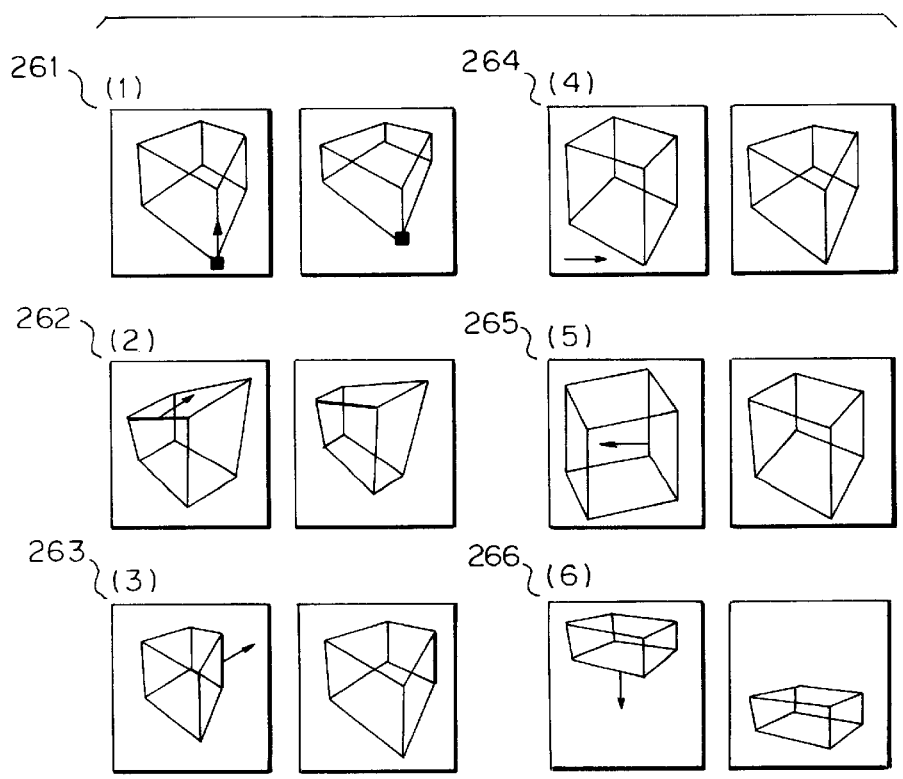
FIG. 5 illustrates the steps of manipulating the rectangular parallelepiped guide figure.

Next, by referring to FIGS. 4 and 5, the rectangular parallelepiped guide figure manipulation routine 510 is explained. The manipulations of the rectangular parallelepiped guide figure are classed as follows according to the mouse and key operations. Examples of these classifications are shown in FIG. 5. In the drawing, views on the left represent the shapes before manipulation and those on the right represent the shapes after manipulation. The arrow in the figure represents the direction in which the mouse is dragged.

Vertical deformation 261 is a case where a vertex 211-218 is selected with a mouse. Horizontal deformation only in one direction 262 is a case where a horizontal side 221, 222, 223, 224, 229, 230, 231 or 232) is selected with a mouse. Horizontal deformation in two directions 263 is a case where a vertical side 225, 226, 227 or 228 is selected with a mouse. Adjusting the field of view angle 264 is a case where an area outside the rectangular parallelepiped guide figure is selected with a mouse. Rotation 265 is a case where an area inside the rectangular parallelepiped guide figure other than the above is selected with a mouse. Moving 266 is a case where an area inside the rectangular parallelepiped guide FIG. 240 is selected with a mouse with a certain special key such as a shift key pressed.

The above operation procedures will be explained in detail as follows:

Vertical deformation (261)

This is a case where a vertex 218 is selected with a mouse. The program stands by until the mouse button is released. Let the vertical coordinate on the screen of the mouse cursor be Sv when the mouse button is released. Using the vanishing points of the rectangular parallelepiped guide figure data table 530, the selected vertex 218 is moved until its two-dimensional vertical coordinate 402 is Sv. Further, by using these vanishing points, the coordinates of the remaining three vertices 215, 216 and 217 of a horizontal plane containing the vertex 218 are determined. With this operation, the rectangular parallelepiped guide figure is deformed in the vertical direction.

Horizontal deformation only in one direction (262)

An example case where a side 223 is selected with a mouse will be considered. The program stands by until the mouse button is released. Let the coordinates of the mouse cursor be (Sh, Sv) when the mouse button is released. By using a vanishing point determined from the sides 229 and 231, the side 223 is moved until it passes through the point (Sh, Sv). That is, the intersections of the line connecting the vanishing point and the mouse cursor coordinates (Sh, Sv) with the sides 222 and 224 are taken to be the two-dimensional coordinates 402 of the vertices 213 and 214. Further, by determining the vertices 217 and 218, the rectangular parallelepiped guide figure is deformed in one horizontal direction.

Horizontal deformation in two directions (263)

An example case of selecting a vertical side 225 with a mouse is described. First, let the coordinates of the mouse cursor be (Mh, Mv) when the mouse button is pressed. The program stands by until the mouse button is released. Let the coordinates of the mouse cursor be (Sh, Sv) when the mouse button is released. (Sh-Mh, Sv-Mv) is added to the two-dimensional coordinates of the vertex 211. Further, by determining the vertices 214, 218, 215, 212 and 216, the rectangular parallelepiped guide figure is deformed in two horizontal directions.

Adjusting the field of view angle (264)

An example case of selecting a point outside the rectangular parallelepiped 250 guide figure with a mouse is described. First, let the horizontal coordinate of the mouse cursor be Mh when the mouse button is pressed. The program stands by until the mouse button is released. Let the horizontal coordinate of the mouse cursor when the mouse button is released be Sh. (Sh-Mh) multiplied by a constant u is added to the field of view angle Ea. With this operation, the field of view angle Ea of the rectangular parallelepiped guide figure is changed Adjusting the field of view angle (264)

An example case of selecting a point outside the rectangular parallelepiped guide FIG. 250 with a mouse is described. First, let the horizontal coordinate of the mouse cursor be Mh when the mouse button is pressed. The program stands by until the mouse button is released. Let the horizontal coordinate of the mouse cursor when the mouse button is released be Sh. (Sh-Mh) multiplied by a constant u is added to the field of view angle Ea. With this operation, the field of view angle Ea of the rectangular parallelepiped guide figure is changed.

Rotation (265)

An example case where an area inside the rectangular parallelepiped guide FIG. 240 other than the above is selected with a mouse is described. First, let the coordinates of the mouse cursor be (Mh, Mv) when the mouse button is pressed. The program stands by until the mouse button is released. Let the coordinates of the mouse cursor be (Sh, V) when the mouse button is released. (Sv-Mv) multiplied by a constant r1 is added to the rotation angle α 408 about the horizontal axis of the rectangular parallelepiped guide figure. Similarly, (Sh-Mh) multiplied by a constant r2 is added to the rotation angle β (408) about the vertical axis. With this operation, the rectangular parallelepiped guide figure is rotated.

Moving (266)

An example case where an area inside the rectangular parallelepiped guide FIG. 240 is selected with a mouse with a certain special key such as a shift key pressed. Let the mouse cursor coordinates be (Mh, Mv) when the mouse button is pressed. The program stands by until the mouse button is released. Let the mouse cursor coordinates be (Sh, Sv) when the mouse button is released. (Sh-Mh, Sv-Mv) is added to the two-dimensional coordinates 402 of the vertex 214 of the rectangular parallelepiped guide figure. Three-dimensional coordinates 404 of the vertex 214 are determined. Let the move vector of the vertex 214 in the three-dimensional space be (dx, dy, dz). (dx, dy, dz) is added to all vertices except for the vertex 214. With this operation, the rectangular parallelepiped guide figure is moved.

5. Camera Angle Calculation Routine

Next, by referring to FIGS. 6 to 9, the camera angle calculation routine 520 will be explained.

The camera angle calculation routine uses the technique of drawing to calculate the camera angle C (eye position, viewing direction and field of view angle) from the rectangular parallelepiped guide figure data table 530 updated by the rectangular parallelepiped guide figure manipulation routine 510. Other rectangular parallelepiped guide figure data tables 530 affected by the calculated camera angle are updated. Each of the operation procedures classified by the rectangular parallelepiped guide figure manipulation routine 510 is described as follows:

Vertical deformation (261)

Figure 6:
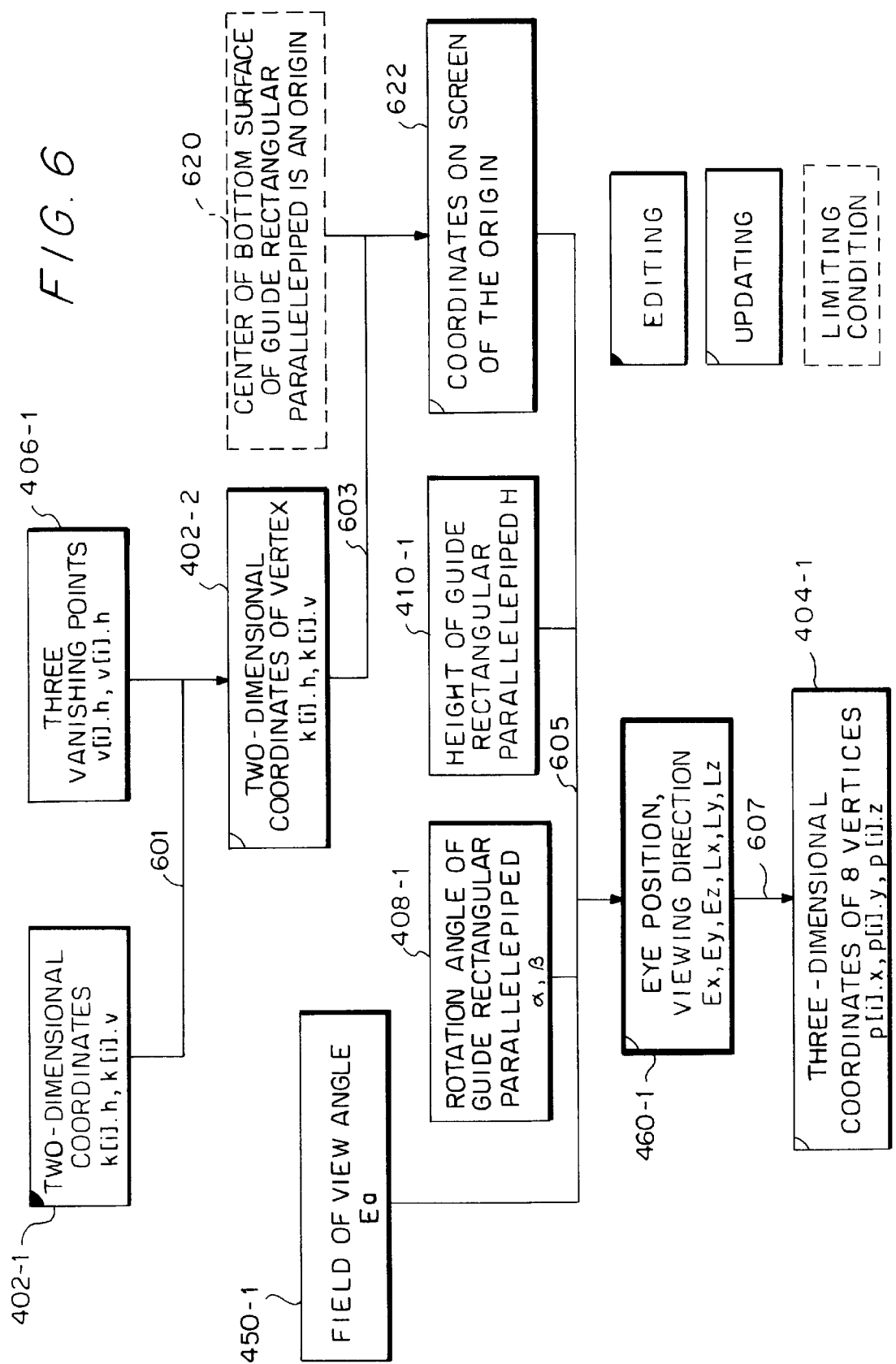
FIG. 6 is a diagram illustrating the process of calculating a camera angle from the rectangular parallelepiped guide figure data table.

At step 601 in FIG. 6, the two-dimensional vertex coordinates 402-2 of the rectangular parallelepiped guide figure are updated from the two-dimensional vertex coordinates 402-1 of the rectangular parallelepiped guide figure before and after the operation and the three vanishing points 406-1. At step 603, under the limiting condition 620 that the center of the bottom surface of the rectangular parallelepiped guide figure is the origin of the three-dimensional space, the coordinates on the two-dimensional screen at which the origin is projected is determined 622. At step 605, the eye position (Ex, Ey, Ez) and the viewing direction (Lx, Ly, Lz) of the camera angle C are determined from the field of view angle Ea 450-1, the rotation angle α and β of the guide rectangular parallelepiped 408-1, the height of the guide rectangular parallelepiped H 410-1 and the coordinates on the screen of the origin 622. The detail of the calculation procedure is as follows. First, let the number of pixels in the horizontal direction on the screen be Hp. Q, P and F are determined from the following formulas.

$$Q = \frac{Hp}{\tan\frac{Ea}{2} \cdot |\tan\beta|}$$ (Equation 1)

$$P = Q \cdot \tan^2\beta$$ (Equation 2)

$$F = \sqrt{P \cdot Q}$$ (Equation 3)

Next, suppose that the value of the eye position Ey is Ytmp=1 and then the camera angle Ex, Ey, Ez, Lx, Ly, Lz are determined as follows:

$Ex=0$ $Ey=Ytmp$ $Ez=0$ (Equation 4)

$Lx=-F \cdot \cos\beta \cdot \sin\alpha$ $Ly=Ytmp-F \cdot \sin\beta$ $Lz=-F \cdot \cos\beta \cos\alpha$ (Equation 5)

From the calculated camera angle and the two-dimensional coordinates k[i], three-dimensional coordinates $P_i$ are determined. Next, the height of the guide rectangular parallelepiped is determined as follows:

$$V = \sqrt{(P[7] \cdot x - P[3] \cdot x)^2 + (P[7] \cdot y - P[3] \cdot y)^2 + (P[7] \cdot z - P[3] \cdot z)^2}$$ (Equation 6)

Because the height of the rectangular parallelepiped guide figure is defined as H, the preliminarily determined Ytmp is corrected as follows based on the relation between H and V.

$Ytmp=Ytmp \cdot H/V$ (Equation 7)

Using the calculated Ytmp again, the camera angle is determined from Equation 4 and Equation 5.

At step 607, the three-dimensional coordinates of vertices of the rectangular parallelepiped guide FIG. 404-1 are updated based on the eye position and the viewing direction.

Horizontal deformation only in one direction (262)

In the same way as in vertical deformation 261, the camera angle C is calculated according to the two-dimensional vertex coordinates of the rectangular parallelepiped guide figure before and after the operation by using other rectangular parallelepiped guide figure data tables.

Horizontal deformation in two directions (263)

As in vertical deformation 261, the camera angle C is calculated according to the two-dimensional vertex coordinates of the rectangular parallelepiped guide figure before and after the operation by using other rectangular parallelepiped guide figure data tables.

Adjusting the field of view angle (264)

Figure 7:
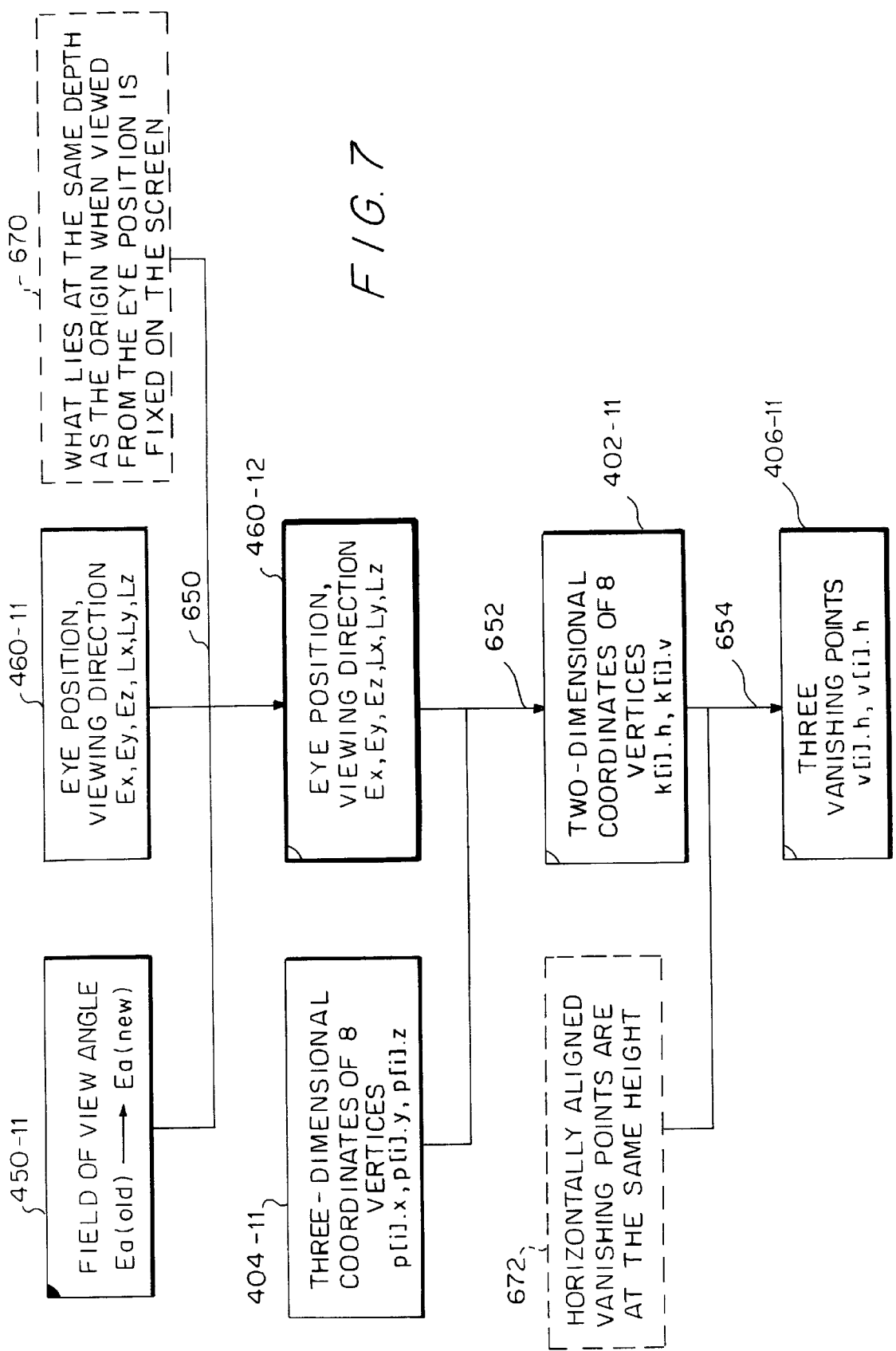
FIG. 7 is a diagram illustrating the process of calculating a camera angle from the rectangular parallelepiped guide figure data table.

At step 650 of FIG. 7, the eye position (Ex, Ey, Ez) and the viewing direction (Lx, Ly, Lz) are updated 460-12 based on the field of view angle Ea 450-11 and the eye position (Ex, Ey, Ez) and viewing direction (Lx, Ly, Lz) 460-11 and also on the limiting condition that what lies at the same depth as the origin when seen from the eye position is fixed on the screen. Changing the field of view angle normally results in a change in the size of a figure projected on the screen. For example, when the field of view angle is increased, the size of the figure projected becomes small. Because of the above limiting condition 670, widening the field of view angle causes the field of view to be projected on an increased area on the two-dimensional plane, with an object farther than the origin projected smaller than before the field of view angle is changed. In more detail, this operation is performed by the following calculation procedure.

First, from the eye position and viewing direction (Ex, Ey, Ez, Lx, Ly, Lz), the visual line vector (Ax, Ay, Az) is determined as follows.

$Ax=Ex-Lx$ $Ay=Ey-Ly$ $Az=Ez-Lz$ (Equation 8)

Next, the scalar W of the visual line vector is determined as follows and is normalized.

$$W = \sqrt{Ax^2 + Ay^2 + Az^2}$$ (Equation 9)

$Ax=Ax/W$ $Ay=Ay/W$ $Az=Az/W$ (Equation 10)

Next, Wk is determined as follows, where Ea(old) is a field of view angle before operation and Ea(new) is a field of view angle after operation.

$$Wk = \frac{\tan\frac{Ea(\text{old})}{2}}{\tan\frac{Ea(\text{new})}{2}} \qquad \text{(Equation 11)}$$

Next, the depth of the origin from the eye position, i.e., the distance measured from the eye perpendicularly to the screen, is taken as Z and the amount of movement J for the eye position and for the viewing direction are determined as follows:

$$J = Z \cdot (Wk - 1) \qquad \text{(Equation 12)}$$

The amount of movement thus obtained is added to the eye position and viewing direction (Ex, Ey, Ez, Lx, Ly, Lz) as follows to determine the eye position and viewing direction that satisfies the condition 670.

$$Ex = Ex + J \cdot Ax$$
$$Ey = Ey + J \cdot Ay$$
$$Ez = Ez + J \cdot Az$$
$$Lx = Lx + J \cdot Ay$$
$$Ly = Ly + J \cdot Ay$$
$$Lz = Lz + J \cdot Az \qquad \text{(Equation 13)}$$

Figure 11A:
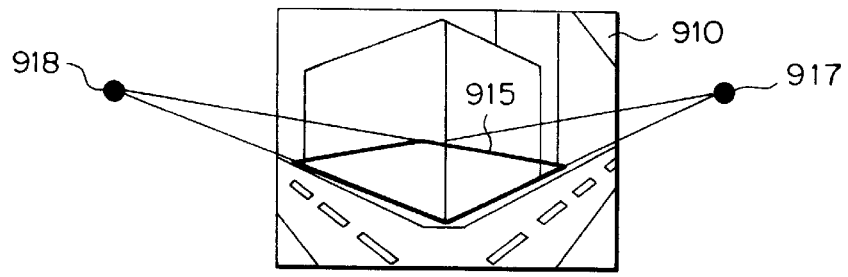
FIGS. 11A, 11B and 11C are diagrams illustrating a conventional method of drawing manipulation.
Figure 11B:
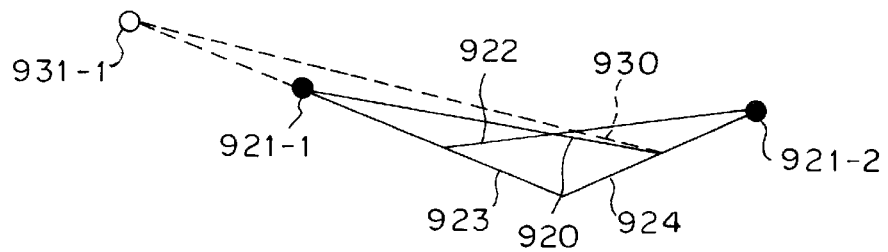
Figure 11C:
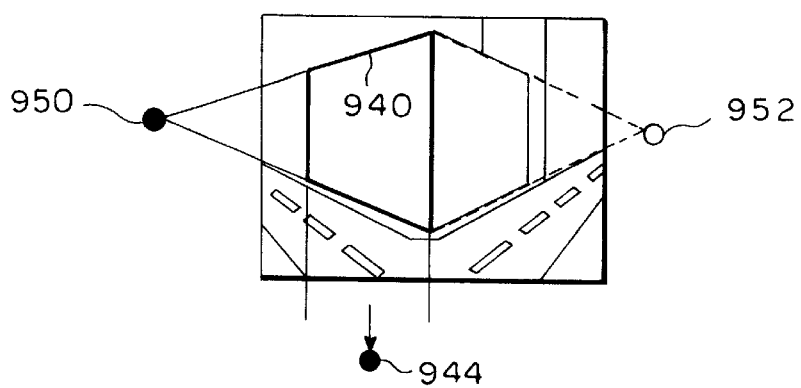

Next, at step 652, the two-dimensional coordinates of vertices of the guide rectangular parallelepiped (402-11) are determined based on the three-dimensional coordinates of vertices of the rectangular parallelepiped guide FIG. 404-11 and the updated eye position and viewing direction 404-12. Under the limiting condition 672 at step 654 that two horizontally aligned vanishing points are at the same height, the three vanishing points 406-11 are determined. This limiting condition 672 ensures that the camera will not rotate about the axis of the viewing direction.

Rotation (265)

Figure 8:
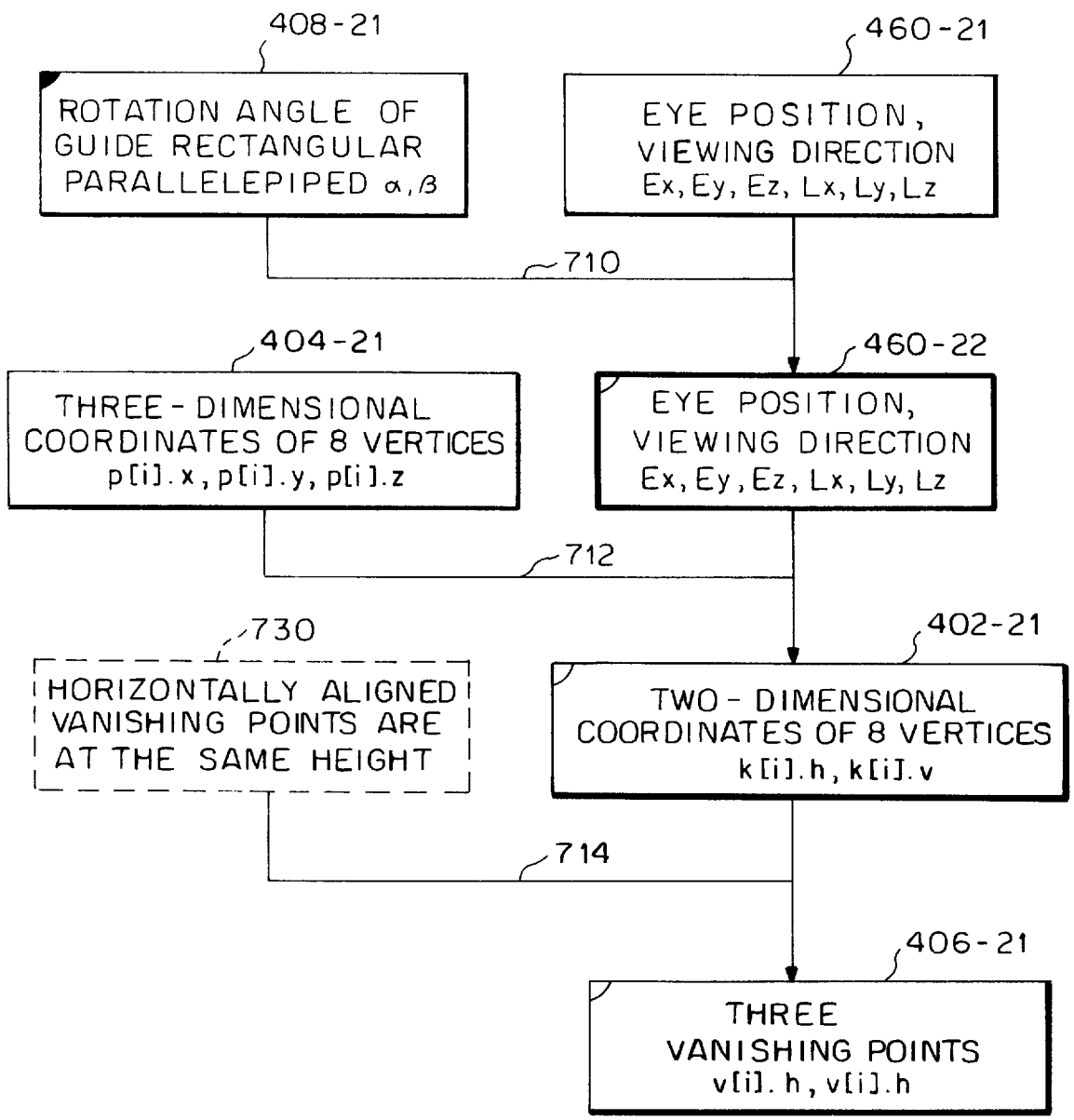
FIG. 8 is a diagram illustrating the process of calculating a camera angle from the rectangular parallelepiped guide figure data table.

At step 710 of FIG. 8, the eye position (Ex, Ey, Ez) and viewing direction (Lx, Ly, Lz) are updated 460-22 based on the rotation angles α and β of the rectangular parallelepiped guide figure before and after the operation 408-21 and the eye position (Ex, Ey, Ez) and viewing direction (Lx, Ly, Lz) (460-21). Next at step 712, two-dimensional coordinates of the rectangular parallelepiped guide FIG. 402-21 are determined from the three-dimensional coordinates of the guide rectangular parallelepiped 404-21 and the updated eye position and viewing direction 460-22. At step 714, three vanishing points are determined 406-21 from the limiting condition 730 that the horizontally aligned two vanishing points are at the same height.

Moving (266)

Figure 9:
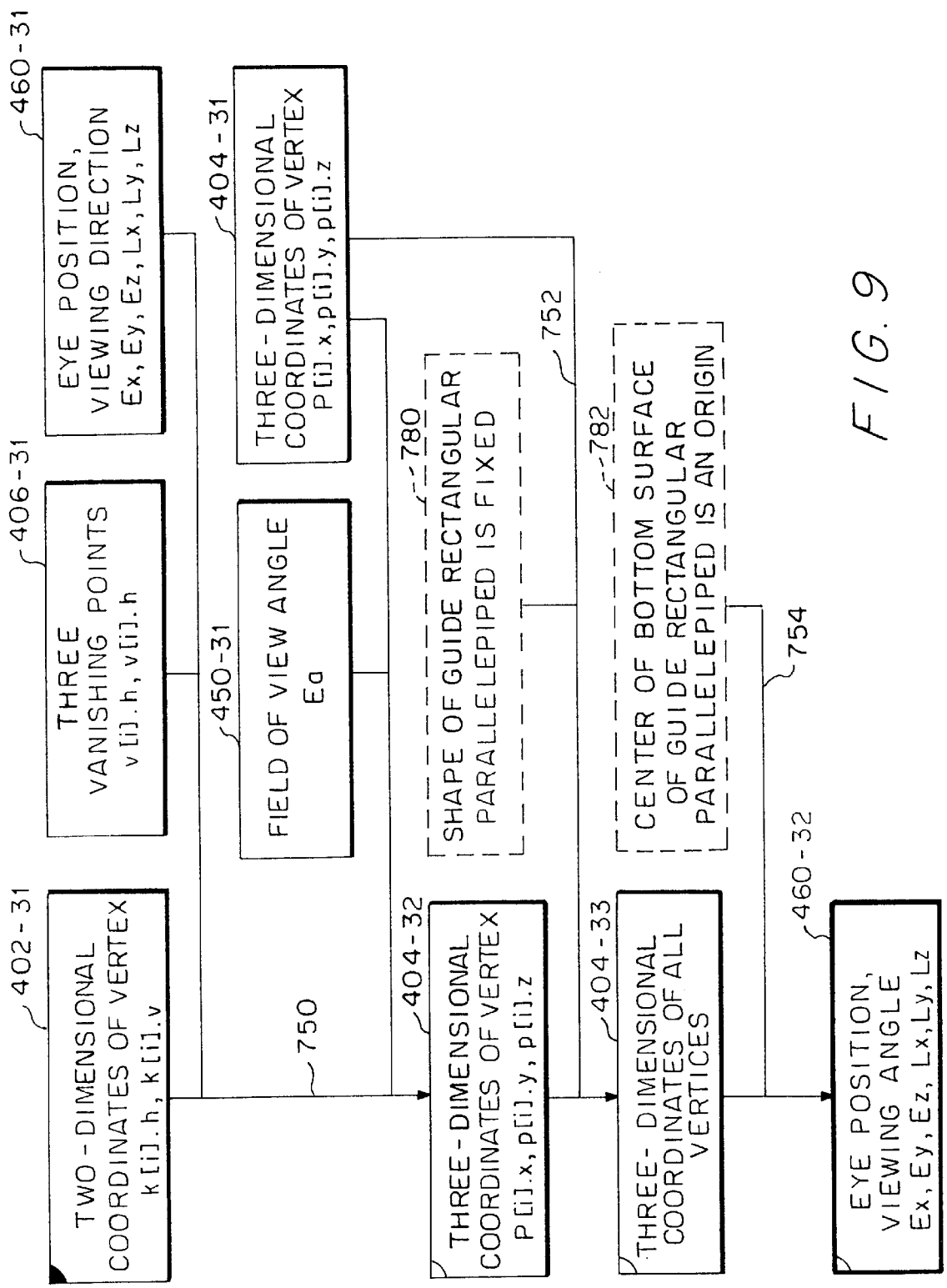
FIG. 9 is a diagram illustrating the process of calculating a camera angle from the rectangular parallelepiped guide figure data table.

At step 750 of FIG. 9, three-dimensional coordinates of a vertex 214 of the guide rectangular parallelepiped 404-32 are determined from the two-dimensional coordinates of the vertex 214 of the rectangular parallelepiped guide figure before and after editing 402-31, the three vanishing points 406-31, the eye position and viewing direction 460-31, the field of view angle 450-31 and the three-dimensional coordinates of the rectangular parallelepiped guide FIG. 404-31. From the vertex coordinates as well as the limiting condition 780 that the vertex coordinates and the shape of the rectangular parallelepiped guide figures are fixed, the three-dimensional coordinates of seven other vertices of the rectangular parallelepiped guide FIG. 404-33 are determined. At step 754, the eye position and viewing direction 460-32 are determined from the three-dimensional coordinates of the rectangular parallelepiped guide figure as well as the limiting condition 782 that the center of the bottom surface of the rectangular parallelepiped guide figure is the origin of the three-dimensional space.

By relating the three-dimensional coordinates of the rectangular parallelepiped guide figure with the two-dimensional coordinates projected on the two-dimensional screen and parameters such as vanishing points, it is possible to reliably determine the camera angle that conforms to the perspective background image.

6. Using the system for generating perspective projection

Figure 10:
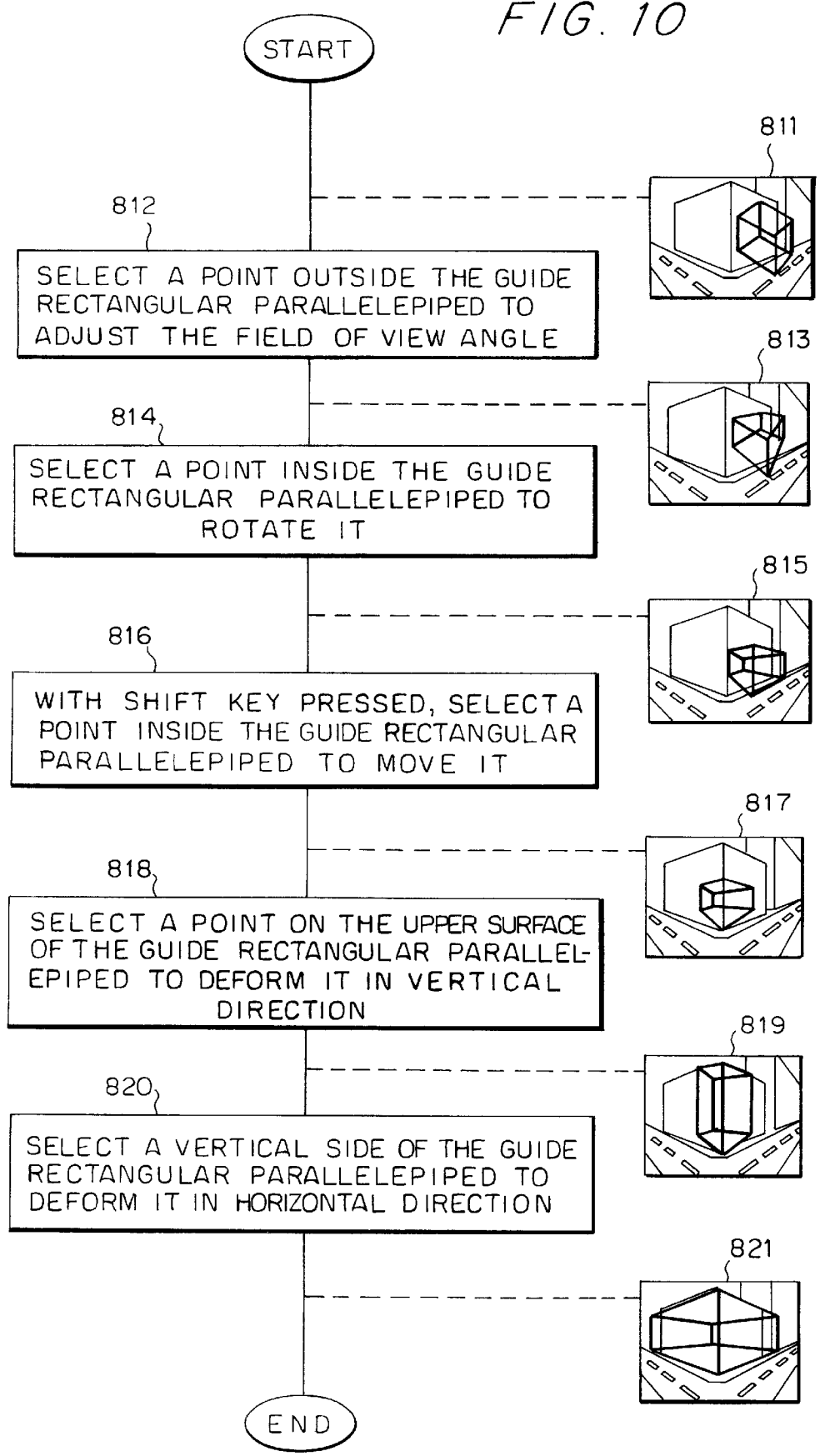
FIG. 10 is a flow chart illustrating by example uses of the present invention.

Lastly, an example of use of the system for perspective projection of this embodiment is explained by referring to FIG. 10. Shown at the left in FIG. 10 is a flow chart and shown at the right area series of screens 811–819 produced at each step.

A screen 811 illustrates a rectangular parallelepiped guide figure before being manipulated. The background image has already been read in. At step 812, the user selected a point outside the rectangular parallelepiped guide figure and dragged it horizontally. As a result, the field of view angle was updated and, as shown in a screen 813, the rectangular parallelepiped guide figure is shown distorted. Next, at step 814, the user selected a point inside the rectangular parallelepiped guide figure and dragged it. As a result, the rotation angle of the rectangular parallelepiped guide figure was updated and, as shown in a screen 815, the rectangular parallelepiped guide figure is shown rotated. At step 816, the user selected a point inside the rectangular parallelepiped guide figure with a mouse with a shift key pressed. As a result, the rectangular parallelepiped guide figure was moved parallelly. As a result, as shown in a screen 817, one of the vertices of the bottom surface agreed with the vertex of the bottom surface of the building.

At step 818, one point on the upper surface of the rectangular parallelepiped guide figure was selected. As a result, the rectangular parallelepiped guide figure was deformed in the vertical direction. As a result, as shown in a screen 819, one of the vertices of the top surface agrees with one point on the upper surface of the building. At step 820, a vertical side of the rectangular parallelepiped guide figure was selected. As a result, as shown in a screen 821, the top and bottom surfaces of the rectangular parallelepiped guide figure agrees with the top and bottom surfaces of the building.

As described above, by moving and deforming the rectangular parallelepiped guide figure so that it conforms with the key features of the perspective background image, the camera angle C can be determined.

In the present invention, the sides of the rectangular parallelepiped guide figure can be reliably made to conform with the key features of the two-dimensional perspective background image, making it possible to calculate the camera angle complying with the perspective background image. It is therefore possible to produce a synthesized drawing of a figure which appears compatible with the background image.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of supporting perspective projection, comprising the steps of:

displaying a three-dimensional guide figure having a plurality of vertices on a two-dimensional background image;

manipulating said guide figure to match key features of said two-dimensional background image; and calculating a camera angle of said two-dimensional background image from said manipulated guide figure.

2. A method according to claim 1, wherein said guide figure is a rectangular parallelepiped having eight vertices.

3. A method according to claim 1, wherein said manipulating step comprises the steps of:

selecting a vertex of said guide figure with a pointing device; and deforming the shape of said guide figure at said selected vertex to cause sides of said guide figure to match key features of said two-dimensional background image.

4. A method according to claim 1, wherein said manipulating step comprises the steps of:

selecting a side of said guide figure with a pointing device; and deforming the shape of said guide figure at said selected side to cause the sides of said guide figure to match key features of said two dimensional background image.

5. A method according to claim 1, wherein said manipulating step comprises the steps of:

selecting a line of said guide figure with a pointing device; and deforming the shape of said guide figure at said selected line to cause sides of said guide figure to match key features of said two-dimensional background image.

6. A method according to claim 1, wherein said manipulating step comprises the steps of:

selecting a plane of said guide figure with a pointing device; and rotating orientation of said guide figure to cause sides of said guide figure to match key features of said two-dimensional background image.

7. A method according to claim 1, wherein said manipulating step comprises the steps of:

selecting a plane of said guide figure with a pointing device; and moving a position of said guide figure to cause sides of said guide figure to match key features of said two-dimensional background image.

8. A method of supporting perspective projection of a three-dimensional shape onto a two-dimensional background image, comprising the steps of:

displaying a three-dimensional guide figure having a plurality of vertices on said two-dimensional image;

manipulating said guide figure to match key features of said two-dimensional background image;

relating three-dimensional coordinates of each vertex of said guide figure to two-dimensional coordinates of said guide figure when projected onto said two-dimensional background image;

determining at least one vanishing point of said guide figure, a rotation angle of said guide figure, and a length of at least one side of said guide figure; and calculating a camera angle for use when projecting said three-dimensional shape onto said two-dimensional background image, from said three-dimensional coordinates of each vertex of said guide figure, said two-dimensional coordinates of said guide figure, said at least one vanishing point of said guide figure, said rotation angle of said guide figure and said length of at least one side of said guide figure.

9. A method according to claim 8, wherein said manipulating step comprises the steps of:

selecting a vertex of said guide figure with a pointing device; and deforming the shape of said guide figure at said selected vertex to cause sides of said guide figure to match key features of said two-dimensional background image.

10. A method according to claim 8, wherein said manipulating step comprises the steps of:

selecting a side of said guide figure with a pointing device; and deforming the shape of said guide figure at said selected side to cause the sides of said guide figure to match key features of said two dimensional background image.

11. A method according to claim 8, wherein said manipulating step comprises the steps of:

selecting a line of said guide figure with a pointing device; and deforming the shape of said guide figure at said selected line to cause sides of said guide figure to match key features of said two-dimensional background image.

12. A method according to claim 8, wherein said manipulating step comprises the steps of:

selecting a plane of said guide figure with a pointing device; and rotating orientation of said guide figure to cause sides of said guide figure to match key features of said two-dimensional background image.

13. A method according to claim 8, wherein said manipulating step comprises the steps of:

selecting a plane of said guide figure with a pointing device; and moving a position of said guide figure to cause sides of said guide figure to match key features of said two-dimensional background image.

14. A method of supporting perspective projection of a three-dimensional shape on a two-dimensional background image, comprising the steps of:

displaying a three-dimensional guide figure having a plurality of vertices on said two-dimensional background image;

manipulating a field of view angle to match a side of said guide figure to key features of said two-dimensional background image; and calculating from said guide figure, when said side of said guide figure matches key features of said two-dimensional background image, a camera angle for use when projecting said three-dimensional shape on said two-dimensional background image.

15. A method according to claim 14, wherein said manipulating step comprises the steps of:

changing said field of view angle; and moving an eye position in a viewing direction according to a change in said field of view angle so as to fix a size of an area on said two-dimensional background image upon which said three-dimensional shape is to be projected.

16. A method according to claim 14, wherein said guide figure is a rectangular parallelepiped having eight vertices.

17. A computer program for supporting perspective projection, said computer program stored on a storage medium and being executable by a computer to cause said computer to perform the steps of:

displaying a three-dimensional guide figure having a plurality of vertices on a two-dimensional background image;

manipulating said guide figure to match key features of said two-dimensional background image; and calculating a camera angle of said two-dimensional background image from said manipulated guide figure.

18. A computer program according to claim 17, wherein said guide figure is a rectangular parallelepiped having eight vertices.

19. A computer program according to claim 17, wherein said manipulating step comprises the steps of:

selecting a vertex of said guide figure with a pointing device; and deforming the shape of said guide figure at said selected vertex to cause sides of said guide figure to match key features of said two-dimensional background image.

20. A computer program according to claim 17, wherein said manipulating step comprises the steps of:

selecting a side of said guide figure with a pointing device; and deforming the shape of said guide figure at said selected side to cause the sides of said guide figure to match key features of said two dimensional background image.

21. A computer program according to claim 17, wherein said manipulating step comprises the steps of:

selecting a line of said guide figure with a pointing device; and deforming the shape of said guide figure at said selected line to cause sides of said guide figure to match key features of said two-dimensional background image.

22. A computer program according to claim 17, wherein said manipulating step comprises the steps of:

selecting a plane of said guide figure with a pointing device; and rotating orientation of said guide figure to cause sides of said guide figure to match key features of said two-dimensional background image.

23. A computer program according to claim 17, wherein said manipulating step comprises the steps of:

selecting a plane of said guide figure with a pointing device; and moving a position of said guide figure to cause sides of said guide figure to match key features of said two-dimensional background image.

24. A computer program according to claim 17, wherein said storage medium is provided by a server which distributes said computer program to said computer via a network.

25. A computer program for supporting perspective projection of a three-dimensional shape onto a two-dimensional background image, said computer program stored on a storage medium and being executable by a computer to cause said computer to perform the steps of:

displaying a three-dimensional guide figure having a plurality of vertices on said two-dimensional image;

manipulating said guide figure to match key features of said two-dimensional background image;

relating three-dimensional coordinates of each vertex of said guide figure to two-dimensional coordinates of said guide figure when projected onto said two-dimensional background image;

determining at least one vanishing point of said guide figure, a rotation angle of said guide figure, and a length of at least one side of said guide figure; and calculating a camera angle for use when projecting said three-dimensional shape onto said two-dimensional background image, from said three-dimensional coordinates of each vertex of said guide figure, said two-dimensional coordinates of said guide figure, said at least one vanishing point of said guide figure, said rotation angle of said guide figure and said length of at least one side of said guide figure.

26. A computer program according to claim 25, wherein said manipulating step comprises the steps of:

selecting a vertex of said guide figure with a pointing device; and deforming the shape of said guide figure at said selected vertex to cause sides of said guide figure to match key features of said two-dimensional background image.

27. A computer program according to claim 25, wherein said manipulating step comprises the steps of:

selecting a side of said guide figure with a pointing device; and deforming the shape of said guide figure at said selected side to cause the sides of said guide figure to match key features of said two dimensional background image.

28. A computer program according to claim 25, wherein said manipulating step comprises the steps of:

selecting a line of said guide figure with a pointing device; and deforming the shape of said guide figure at said selected line to cause sides of said guide figure to match key features of said two-dimensional background image.

29. A computer program according to claim 25, wherein said manipulating step comprises the steps of:

selecting a plane of said guide figure with a pointing device; and rotating orientation of said guide figure to cause sides of said guide figure to match key features of said two-dimensional background image.

30. A computer program according to claim 25, wherein said manipulating step comprises the steps of:

selecting a plane of said guide figure with a pointing device; and moving a position of said guide figure to cause sides of said guide figure to match key features of said two-dimensional background image.

31. A computer program according to claim 25, wherein said manipulating step comprises the steps of:

selecting a plane of said guide figure with a pointing device; and moving a position of said guide figure to cause sides of said guide figure to match key features of said two-dimensional background image.

32. A computer program for supporting perspective projection of a three-dimensional shape on a two-dimensional background image, said computer program stored on a storage medium and being executable by a computer to cause said computer to perform the steps of:

displaying a three-dimensional guide figure having a plurality of vertices on said two-dimensional background image;

manipulating a field of view angle to match a side of said guide figure to key features of said two-dimensional background image; and calculating from said guide figure, when said side of said guide figure matches key features of said two-dimensional background image, a camera angle for use when projecting said three-dimensional shape on said two-dimensional background image.

33. A computer program according to claim 32, wherein said manipulating step comprises the steps of:

changing said field of view angle; and moving an eye position in a viewing direction according to a change in said field of view angle so as to fix a size of an area on said two-dimensional background image upon which said three-dimensional shape is to be projected.

34. A computer program according to claim 32, wherein said guide figure is a rectangular parallelepiped having eight vertices.

35. A computer program according to claim 32, wherein said manipulating step comprises the steps of:

selecting a plane of said guide figure with a pointing device; and moving a position of said guide figure to cause sides of said guide figure to match key features of said two-dimensional background image.

36. A three-dimensional computer aided design (CAD) computer program including a function for supporting perspective projection, said three-dimensional CAD computer program being stored on a storage medium and being executable by a computer to cause said computer to perform the steps of:

displaying a three-dimensional guide figure having a plurality of vertices on a two-dimensional background image;

manipulating said guide figure to match key features of said two-dimensional background image; and calculating a camera angle of said two-dimensional background image from said manipulated guide figure.

37. A thee-dimensional CAD computer program according to claim 36, wherein said guide figure is a rectangular parallelepiped having eight vertices.

38. A thee-dimensional CAD computer program according to claim 36, wherein said manipulating step comprises the steps of:

selecting a vertex of said guide figure with a pointing device; and deforming the shape of said guide figure at said selected vertex to cause sides of said guide figure to match key features of said two-dimensional background image.

39. A thee-dimensional CAD computer program according to claim 36, wherein said manipulating step comprises the steps of:

selecting a side of said guide figure with a pointing device; and deforming the shape of said guide figure at said selected side to cause the sides of said guide figure to match key features of said two dimensional background image.

40. A three-dimensional CAD computer program according to claim 36, wherein said manipulating step comprises the steps of:

selecting a line of said guide figure with a pointing device; and deforming the shape of said guide figure at said selected line to cause sides of said guide figure to match key features of said two-dimensional background image.

41. A three-dimensional CAD computer program according to claim 36, wherein said manipulating step comprises the steps of:

selecting a plane of said guide figure with a pointing device; and rotating orientation of said guide figure to cause sides of said guide figure to match key features of said two-dimensional background image.

42. A three-dimensional CAD computer program according to claim 36, wherein said manipulating step comprises the steps of:

selecting a plane of said guide figure with a pointing device; and moving a position of said guide figure to cause sides of said guide figure to match key features of said two-dimensional background image.

43. A three-dimensional CAD computer program according to claim 36, wherein said storage medium is provided by a server which distributes said three-dimensional CAD computer program to said computer via a network.

44. A three-dimensional computer aided design (CAD) computer program including a function for supporting perspective projection of a three-dimensional shape onto a two-dimensional background image, said three-dimensional CAD computer program being stored on a storage medium and being executable by a computer to cause said computer to perform the steps of:

displaying a three-dimensional guide figure having a plurality of vertices on said two-dimensional image;

manipulating said guide figure to match key features of said two-dimensional background image;

relating three-dimensional coordinates of each vertex of said guide figure to two-dimensional coordinates of said guide figure when projected onto said two-dimensional background image;

determining at least one vanishing point of said guide figure, a rotation angle of said guide figure, and a length of at least one side of said guide figure; and calculating a camera angle for use when projecting said three-dimensional shape onto said two-dimensional background image, from said three-dimensional coordinates of each vertex of said guide figure, said two-dimensional coordinates of said guide figure, said at least one vanishing point of said guide figure, said rotation angle of said guide figure and said length of at least one side of said guide figure.

45. A three-dimensional CAD computer program according to claim 44, wherein said manipulating step comprises the steps of:

selecting a vertex of said guide figure with a pointing device; and deforming the shape of said guide figure at said selected vertex to cause sides of said guide figure to match key features of said two-dimensional background image.

46. A three-dimensional CAD computer program according to claim 44, wherein said manipulating step comprises the steps of:

selecting a side of said guide figure with a pointing device; and deforming the shape of said guide figure at said selected side to cause the sides of said guide figure to match key features of said two dimensional background image.

47. A three-dimensional CAD computer program according to claim 44, wherein said manipulating step comprises the steps of:

selecting a line of said guide figure with a pointing device; and deforming the shape of said guide figure at said selected line to cause sides of said guide figure to match key features of said two-dimensional background image.

48. A three-dimensional CAD computer program according to claim 44, wherein said manipulating step comprises the steps of:
  selecting a plane of said guide figure with a pointing device; and
  rotating orientation of said guide figure to cause sides of said guide figure to match key features of said two-dimensional background image.

49. A three-dimensional CAD computer program according to claim 44, wherein said manipulating step comprises the steps of:
  selecting a plane of said guide figure with a pointing device; and
  moving a position of said guide figure to cause sides of said guide figure to match key features of said two-dimensional background image.

50. A three-dimensional CAD computer program according to claim 44, wherein said storage medium is provided by a server which distributes said three-dimensional CAD computer program to said computer via a network.

51. A three-dimensional computer aided design (CAD) computer program including a function for of supporting perspective projection of a three-dimensional shape on a two-dimensional background image, said three-dimensional CAD computer program being stored on a storage medium and being executable by a computer to cause said computer to perform the steps of:
  displaying a three-dimensional guide figure having a plurality of vertices on said two-dimensional background image;
  manipulating a field of view angle to match a side of said guide figure to key features of said two-dimensional background image; and
  calculating from said guide figure, when said side of said guide figure matches key features of said two-dimensional background image, a camera angle for use when projecting said three-dimensional shape on said two-dimensional background image.

52. A three-dimensional CAD computer program according to claim 51, wherein said manipulating step comprises the steps of:
  changing said field of view angle; and
  moving an eye position in a viewing direction according to a change in said field of view angle so as to fix a size of an area on said two-dimensional background image upon which said three-dimensional shape is to be projected.

53. A three-dimensional CAD computer program according to claim 51, wherein said guide figure is a rectangular parallelepiped having eight vertices.

54. A three-dimensional CAD computer program according to claim 51, wherein said manipulating step comprises the steps of:
  selecting a plane of said guide figure with a pointing device; and
  moving a position of said guide figure to cause sides of said guide figure to match key features of said two-dimensional background image.

55. A system for supporting perspective projection, comprising:
  a display;
  input apparatus; and
  a processor which displays on said display a three-dimensional guide figure having a plurality of vertices on a two-dimensional background image, manipulates said guide figure to match key features of said two-dimensional background image in response to user inputs via said input apparatus, and calculates a camera angle of said two-dimensional background image from said manipulated guide figure.

56. A system according to claim 55, wherein said guide figure is a rectangular parallelepiped having eight vertices.

57. A system method according to claim 55, wherein said processor when manipulating said guide figure allows said user to select a vertex of said guide figure with a pointing device included in said input apparatus and deform the shape of said guide figure at said selected vertex to cause sides of said guide figure to match key features of said two-dimensional background image.

58. A system according to claim 55, wherein said processor when manipulating said guide figure allows said user to select a side of said guide figure with a pointing device included in said input apparatus and deform the shape of said guide figure at said selected side to cause the sides of said guide figure to match key features of said two dimensional background image.

59. A system according to claim 55, wherein said processor when manipulating said guide figure allows said user to select a line of said guide figure with a pointing device included in said input apparatus and deform the shape of said guide figure at said selected line to cause sides of said guide figure to match key features of said two-dimensional background image.

60. A system according to claim 55, wherein said processor when manipulating said guide figure allows said user to select a plane of said guide figure with a pointing device included in said input apparatus and rotate orientation of said guide figure to cause sides of said guide figure to match key features of said two-dimensional background image.

61. A system according to claim 55, wherein said processor when manipulating said guide figure allows said user to select a plane of said guide figure with a pointing device included in said input apparatus and move a position of said guide figure to cause sides of said guide figure to match key features of said two-dimensional background image.

62. A system for supporting perspective projection of a three-dimensional shape onto a two-dimensional background image, comprising:
  a display;
  input apparatus; and
  a processor which displays on said display a three-dimensional guide figure having a plurality of vertices on said two-dimensional image, manipulates said guide figure to match key features of said two-dimensional background image in response to user inputs via said input apparatus, relates three-dimensional coordinates of each vertex of said guide figure to two-dimensional coordinates of said guide figure when projected onto said two-dimensional background image, determines at least one vanishing point of said guide figure, a rotation angle of said guide figure, and a length of at least one side of said guide figure, and calculates a camera angle for use when projecting said three-dimensional shape onto said two-dimensional background image, from said three-dimensional coordinates of each vertex of said guide figure, said two-dimensional coordinates of said guide figure, said at least one vanishing point of said guide figure, said rotation angle of said guide figure and said length of at least one side of said guide figure.

63. A system according to claim 62, wherein said processor when manipulating said guide figure allows said user to select a vertex of said guide figure with a pointing device included in said input apparatus and deform the shape of said guide figure at said selected vertex to cause sides of said guide figure to match key features of said two-dimensional background image.

64. A system according to claim 62, wherein said processor when manipulating said guide figure allows said user to select a plane of said guide figure with a pointing device included in said input apparatus and deform the shape of said guide figure at said selected side to cause the sides of said guide figure to match key features of said two-dimensional background image.

65. A system according to claim 62, wherein said processor when manipulating said guide figure allows said user to select a plane of said guide figure with a pointing device included in said input apparatus and deform the shape of said guide figure at said selected line to cause sides of said guide figure to match key features of said two-dimensional background image.

66. A system according to claim 62, wherein said processor when manipulating said guide figure allows said user to select a plane of said guide figure with a pointing device included in said input apparatus and rotate orientation of said guide figure to cause sides of said guide figure to match key features of said two-dimensional background image.

67. A system according to claim 62, wherein said processor when manipulating said guide figure allows said user to select a plane of said guide figure with a pointing device included in said input apparatus and move a position of said guide figure to cause sides of said guide figure to match key features of said two-dimensional background image.

68. A system for supporting perspective projection of a three-dimensional shape onto a two-dimensional background image, comprising:

a display;

input apparatus; and a processor which displays a three-dimensional guide figure having a plurality of vertices on said two-dimensional image, manipulates said guide figure to match key features of said two-dimensional background image in response to user inputs via said input apparatus, calculates from said guide figure, when said side of said guide figure matches key features of said two-dimensional background image, a camera angle for use when projecting said three-dimensional shape on said two-dimensional background image.

69. A system according to claim 68, wherein said processor when manipulating said guide figure allows said user to change said field of view angle and move an eye position in a viewing direction according to a change in said field of view angle so as to fix a size of an area on said two-dimensional background image upon which said three-dimensional shape is to be projected.

70. A system according to claim 68, wherein said guide figure is a rectangular parallelepiped having eight vertices.

* * * * *